United States Patent [19]

Maggioni et al.

[11] Patent Number: 5,780,995
[45] Date of Patent: Jul. 14, 1998

[54] AUTOMOTIVE VOLTAGE REGULATOR AND CHARGING SYSTEM

[75] Inventors: Giampietro Maggioni, Agrate Brianza; Mirco Contucci, Sant' Arcangelo, both of Italy

[73] Assignee: SGS-Thomson Microelectronics S.r.l., Agrate Brianza, Italy

[21] Appl. No.: 550,690

[22] Filed: Oct. 31, 1995

[30] Foreign Application Priority Data

Oct. 31, 1994 [EP] European Pat. Off. ............ 94830520

[51] Int. Cl.$^6$ ................................................ H02J 7/14
[52] U.S. Cl. ............................ 322/8; 322/28; 320/61; 323/285
[58] Field of Search ............................ 320/6, 61; 322/28, 322/8, 7, 11, 37; 323/285

[56] References Cited

U.S. PATENT DOCUMENTS

| | | | |
|---|---|---|---|
| 3,539,864 | 11/1970 | Harland et al. | 317/13 |
| 3,942,096 | 3/1976 | Itoh et al. | 322/28 |
| 3,942,097 | 3/1976 | Itoh et al. | 322/28 |
| 4,280,087 | 7/1981 | Kaasiewicz | 322/28 |
| 4,618,811 | 10/1986 | Mashino et al. | 322/28 |
| 4,733,159 | 3/1988 | Edwards et al. | 323/282 |
| 5,059,886 | 10/1991 | Nishimura et al. | 322/28 |
| 5,323,102 | 6/1994 | Torii et al. | 322/90 |
| 5,355,071 | 10/1994 | Ishida et al. | 320/6 |
| 5,541,456 | 7/1996 | Maggioni et al. | 307/10.1 |
| 5,550,456 | 8/1996 | Shekhawat et al. | 322/25 |

FOREIGN PATENT DOCUMENTS

| | | |
|---|---|---|
| 0020098 | 12/1980 | European Pat. Off. |
| 0118779 | 10/1984 | European Pat. Off. |

*Primary Examiner*—Steven L. Stephan
*Assistant Examiner*—Nicholas Ponomarenko
*Attorney, Agent, or Firm*—David V. Carlson; John C. Stewart

[57] ABSTRACT

A circuit for regulating the charging voltage to a battery and connected to the field inductor (IND) of an alternator (ALT) which supplies that voltage.

It is connected by a control cable to the battery and comprises an electric path, extending between a terminal for connection to the alternator and ground, which is only activated when the battery voltage drops below a predetermined threshold value.

This electric path comprises a switch (TSW) driven from a control circuit (COMP1.T4) which sense the battery voltage, and when activated, the voltage drop across the path is substantially equal to that of the regulated voltage. The control circuit also senses breakage in the battery sensing cable, and ceases driving the alternator when this occurs.

19 Claims, 3 Drawing Sheets

AUTOMOTIVE VOLTAGE REGULATOR AND CHARGING SYSTEM

CROSS-REFERENCE TO RELATED APPLICATION

This application claims priority from EPC App'n 94830520.6, filed Oct. 31, 1994, which is hereby incorporated by reference. However, the content of the present application is not necessarily identical to that of the priority application.

BACKGROUND AND SUMMARY OF THE INVENTION

This invention relates to circuits for regulating the supply of charging voltage to a battery, and in particular, it concerns those circuits which are monolithically integratable and are also usable to regulate the voltage supply to the electronic equipment of a vehicle.

This type of voltage regulating circuit is mainly employed in the automotive industry, where the widespread use of electric components to control various functions on motor vehicles demands increasingly higher accuracy and reliability of the voltage regulation. Background information on voltage regulators, and automotive charging systems generally, may be found in the following publications, all of which are hereby incorporated by reference: Powers, "On-chip voltage regulator cuts microcontroller system parts count," Powerconversion & Intelligent Motion vol. 21, no. 3 p. 68–72 (March 1995); Wrathall et al., "The design of an automotive low drop out regulator IC utilizing a depletion mode high voltage DMOS pass element," Proceedings of 1994 IEEE Workshop on Power Electronics in Transportation 17–22 (1994); Flaig et al., "Low-drop voltage regulators with optimum EMC," Siemens Components (English Edition) vol. 27, no. 6 p. 6–10 (November–December 1992); Nathe et al., "Voltage regulator with additional watchdog function" IEEE Transactions on Consumer Electronics vol. 36, no. 4 p. 832–6 (November 1990); Salameh et al., "Multi-stage dual priority regulator for photovoltaic systems," IEEE Transactions on Energy Conversion vol. 4, no. 3 308–13 (September 1989); Holt, "Automotive electrical power system simulation (AEPSS)," IEE Colloquium on 'Vehicle Electrical Power Management and Smart Alternators' (Digest No. 53) p. 7/1–7 (1988); Vadher et al., "Modelling and simulation of integrated electronic/electrical systems in modern fighting vehicles," International Journal of Modelling and Simulation vol. 6, no. 2 p. 65–8 (1986); Menniti et al., "Low drop regulator with overvoltage protection and reset function," ESSCIRC 83 (Ninth European Solid-State Circuits Conference) p. 139–41; Trontelj et al., "CMOS pulse voltage regulator for automotive alternators," Conference Title: IEEE 1983 Custom Integrated Circuits Conference 399–400 (1983); all of which are hereby incorporated by reference.

A battery charging system for motor vehicles conventionally comprises an alternator usually in the form, for automotive applications, of a three-phase electric machine with stator and armature windings which are star- or delta-connected to an inductor keyed to the rotor. The AC output voltage generated by the alternator is converted to a DC voltage by a full-wave rectifier having two outputs, one for powering the loads and battery and one for supplying voltage to the field winding and being used as a control terminal by the regulator.

The regulator is, in fact, responsible for controlling the voltage to the electric system of a motor vehicle and maintaining it as far as possible constant, so that it can be utilized by the various electric accessories of the vehicle; another, no less important, function of the regulator being that of permitting the battery to be re-charged, since the battery is the element used to start the engine of motor vehicles. In this latter case, the function of a regulator for alternator applications is to control the voltage to the system so that the battery can be charged correctly.

The voltage to be applied to batteries is, in fact, subject to strict specifications directed to ensuring that the electrochemical process involved can be kept under control throughout the battery operation cycle.

In the so-called machine sensing connect, a control terminal of the regulator is connected to a terminal of the rectifier bridge, and accordingly, does not control the voltage across the battery directly.

The voltage at the bridge terminal approaches in value the voltage value across the battery, but may differ enough because there is a voltage drop due to the current draw from the loads multiplied by the wiring resistance.

Typical values in applications of this kind may be:

Wiring RES=10 mOhm;

Iload=50–100 A.

It follows that this voltage drop can amount to 1 Volt. Thus, the battery may be charged at voltages 1-Volt lower than the regulator rated voltage.

To overcome this problem, another type of connect called "battery sensing" connect has long been adopted; in such a case the control terminal of the regulator is connected directly to the battery so that the battery can be re-charged exactly at the regulator voltage rating regardless of the voltage drop across the wiring and, therefore, of the current draw from the loads.

However, a shortcoming of this kind of connection appears when the sensing wire which connects the control terminal of the voltage regulator to the battery breaks; when this happens, the voltage control is lost and the alternator kept excited at all times, with destructive consequences for the loads and the battery because the system voltage is then allowed to attain the maximum voltage (several tens volts) of the electric machine.

To overcome this drawback and retain control of the system voltage even with a broken sensing cable, a viable prior practice has been that of providing a diode, or several diodes in series with one another, within the voltage regulator, connected between the terminal which is to be connected to the rectifier bridge and the terminal to be connected to the battery through the sensing cable.

In general, a voltage regulator includes an input voltage divider connected between the terminal for connection to the sensing cable and a ground, so that in the event of that cable being broken, the diode will be connected in series with the voltage divider between the rectifier bridge and ground.

The conduction threshold of the diode (or series of several diodes) is set at a higher voltage than the voltage regulator rating, with the difference which may be equal, for example, to the voltage drop across the wiring, so that under normal conditions the diode will not be conducting.

Upon the sensing cable being broken, the diode becomes conductive, and the system voltage can be kept regulated at a higher voltage drop across the diode than the voltage regulator rating.

However, a solution of this kind is not devoid of other problems, such as the possibility for the diode to become conductive even in normal operation, in consequence of a change in the current draw from the loads, which would result in the voltage regulation being altered.

On the other hand, the conduction threshold of the diode or diodes cannot be allowed to rise unrestrictedly, because the very operation of this type of protection might then cause problems to the system by pushing, on the occurrence of a break in the sensing cable, the regulated voltage to an unacceptable level.

Another drawback of the above-described solution is that the thermal drift of the regulated voltage, which is also determined by system requirements, is established by the thermal coefficient of the control stage of the regulator, which includes a definite number of components, so that it would appear altered in the event of breakage of the sensing cable by the thermal coefficient itself of the diode or diodes in conduction.

More complicated circuit arrangements would obviously raise the regulator cost, even where the latter is monolithically integrated.

The technical problem underlying this invention is to provide a monolithically integratable voltage regulator for regulating the charging voltage to a battery which, in the event of a connection cable to the battery being broken, would still retain a higher level of regulation accuracy than that to be obtained with known voltage regulators, even from the thermal drift aspect.

This technical problem is solved by a voltage regulator, as described in detail below, in which the control circuitry also includes a branch which detects breakage in the battery sensing cable, and ceases driving the alternator when this occurs.

In an alternative embodiment, the control circuitry not only senses breakage in the battery sensing cable, but also senses breakage in the connection to the alternator's field winding, and ceases (or reduces) driving the alternator when either breakage occurs.

The present application advantageously provides a complete automotive electrical system, in which the charging system is protected by a breakage-sensing regulator as above. Since the innovative voltage regulator is more reliable, the electrical system and hence the whole vehicle are more reliable (since failure of the charging system will eventually disable the vehicle).

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
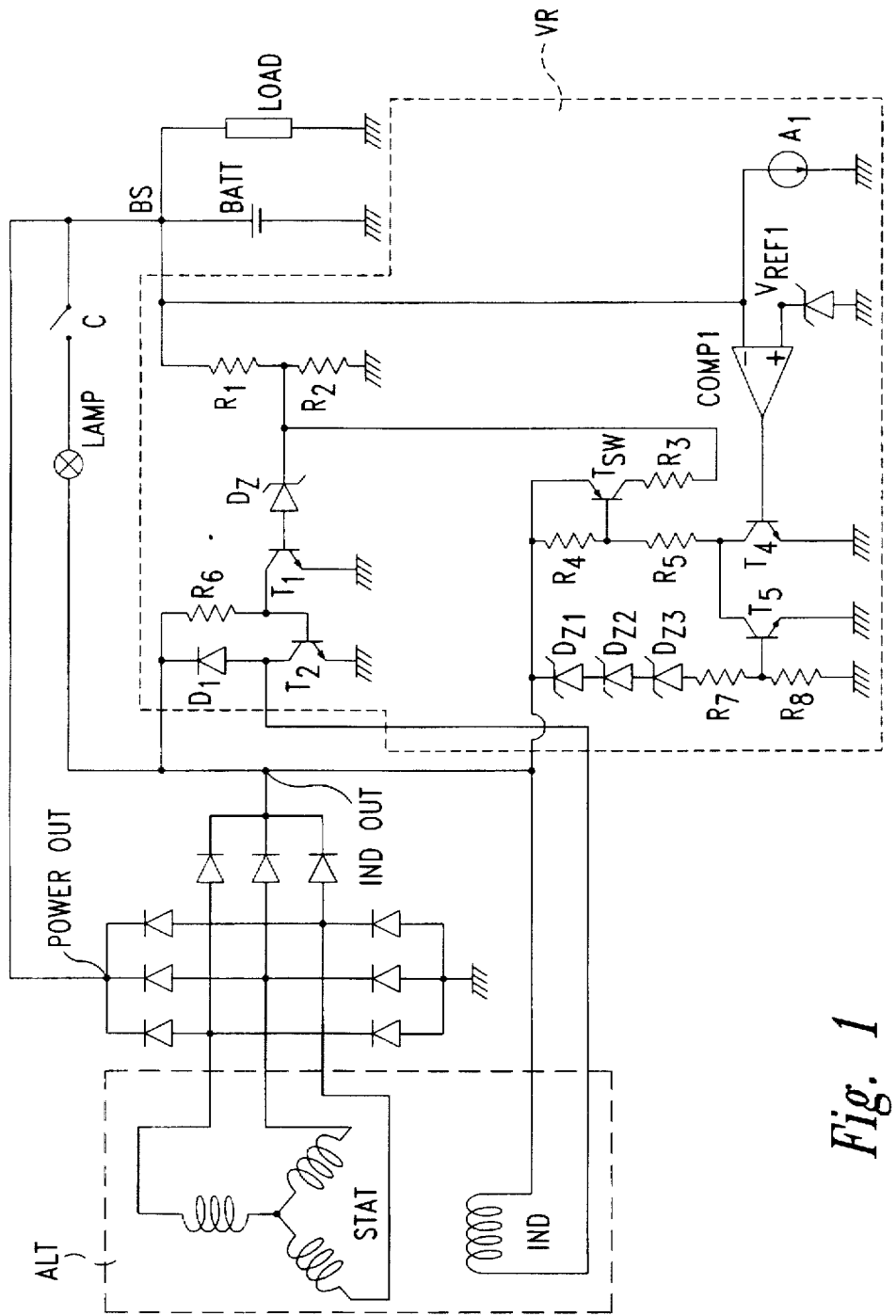
FIGS. 1 and 2 show circuit diagrams for possible power supply systems incorporating a voltage regulator according to the invention.

The numerous innovative teachings of the present application will be described with particular reference to the presently preferred embodiment (by way of example, and not of limitation), in which:

The circuit diagram of FIG. 1 shows a possible embodiment of a voltage regulator according to the invention, as connected in a traditional motor vehicle system.

This voltage regulator, denoted by VR in the Figure and shown with its circuit components bounded within a broken line, is connected between a battery BATT and the inductor or field winding IND of an alternator ALT. The stator STAT of the alternator is connected to a full-wave rectifier of the diode bridge type which has a supply output POWER OUT for the battery BATT and all the electric loads of a vehicle, represented by an impedance LOAD, and a second supply output IND OUT for the field winding IND.

The configuration is a battery sensing one.

In fact, the voltage regulator includes, as usual with regulators, an input voltage divider which consists of two resistances R1 and R2 in series with each other and connected between a circuit node BS for connection to the battery and a ground.

The voltage regulator comprises a regulating stage having a Zener diode DZ and two cascaded transistors T1 and T2 whose input is connected to the voltage divider and whose output is connected to the field inductor.

Connected serially together between the node connecting the output IND OUT of the diode rectifier to the field inductor and the connection node BS to the battery are a control switch C, which is driven by means of the vehicle ignition key, and a light indicator LAMP.

In accordance with the invention, the voltage regulator includes switch TSW which may be either a bipolar transistor of the PNP type as shown in the Figure or a transistor of the MOS type.

The switch TSW is connected between the connection node of the divider resistances R1 and R2 and a terminal connecting the voltage regulator to the field inductor, and is driven by a control circuit effective to sense the voltage across the voltage divider, and hence the battery voltage less the voltage drop across the connection cable between the battery and the voltage regulator, and to only close the switch TSW upon the value of that voltage dropping below a predetermined threshold value which corresponds to a broken sensing cable.

This control circuit can be embodied, as shown in the Figure, by a threshold comparator COMP1 having a first input connected to a reference potential VREF and a second input terminal connected to ground through a current generator A1 and to the voltage divider, either to one end thereof or to an intermediate node, and connected through a transistor T4 to the base of the transistor TSW and driven by the threshold comparator.

Also shown in the Figure, although not essential to this invention, is a circuit means for protection in the rare event of the alternator-to-battery cable being broken, which consists of certain Zener diodes DZ1, DZ2 . . . , connected between the connection terminal for the field inductor and the base of a transistor T5 which, like the transistor T4, is connected to the transistor TSW.

The transistor pair T4, T5 form a logic control gate of the OR type which drives the switch TSW to close both upon an event being revealed through the threshold comparator COMP1 and an event being revealed through the chain of Zener diodes.

It will be understood that a second threshold comparator could be used instead of the chain of Zener diodes for driving the transistor T5.

The invention can also be effectively applied to generic remote-sensing voltage regulators, and in particular to regulators of the multifunction type, again intended for automotive alternator applications.

Figure 2:
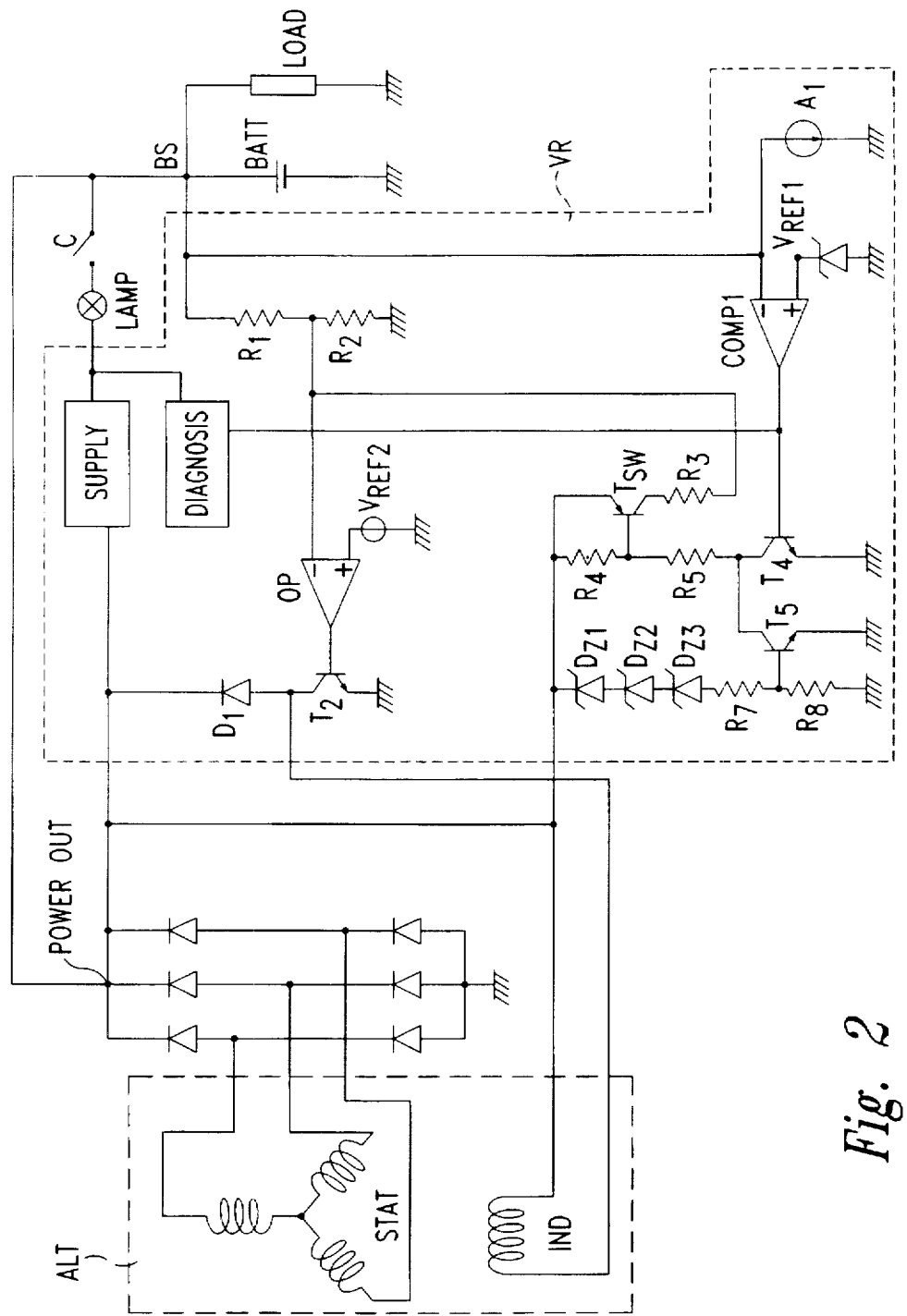

Shown in FIG. 2 is an example of a traditional multifunction regulator incorporating the invention, wherein the same integrated circuit device is used, additionally to regulating the system voltage, for driving the light indicator directly, and malfunctions in the alternator or the system are revealed.

A block VR includes two circuit blocks known to the skilled ones in the art as the supply and troubleshooting blocks, as well as the circuit parts for regulating the voltage.

The supply block recognizes an actuation of the ignition key and enables the regulator operation. The troubleshooting block receives information about the system state and the phase voltage state of the alternator, and turns on the lamps when required.

In multifunction regulators of this type, the regulating portion of the stage usually comprises the Zener diode, and the transistor T1, as shown in FIG. 1, but is replaced here by an operational because the performance demand may be more severe.

It may be seen in FIG. 2 that the diode bridge has been simplified in that the second output IND OUT is no longer required.

To review the operation of a voltage regulator according to the invention, reference can be made to a traditional automotive system, such as that shown in FIG. 1, having a battery rated at 12-Volt, a regulator voltage rating of 14 Volts, an alternator with a current capacity of 100 A, and a resistance of the alternator-to-battery cable of 10 mOhm.

The standard operation is of the battery sensing type. Under this condition, at the node BS would surely appear a voltage higher than 5 Volts, the changeover threshold of the comparator COMP1, whereby the comparator output will be at such a low as to hold the transistor T4, and hence the transistor TSW, in the off state.

The series of the Zener diodes DZ1, DZ2, DZ3 and the transistor T5 is not active because designed for 16 Volts, definitely above the programming voltage of 14 Volts. T4, T5 and TSW are, therefore, in the off state.

With this assumption, the battery voltage, as split by the divider R1, R2, will be applied to the regulating structure DZ, T1 which control T2.

The regulated voltage will be VREG=(VbeT1+BVDZ) (1+R1/R2), where VbeT1 is the base-emitter voltage of the transistor T1, and BVDZ is the conduction threshold voltage of the Zener diode DZ.

In the event of breakage of the cable connecting the resistance R1 to the battery, the comparator has on its "−" inverting input a lower voltage than 5 Volts and, therefore, a high level at its output, whereby the transistor T4, and hence TSW, is driven into conduction.

The latter transistor serves, as previously mentioned, a switch function to connect the resistance R3 to the alternator. The current generator A1 is connected to hold the regulator input at a low level.

Figure 3:
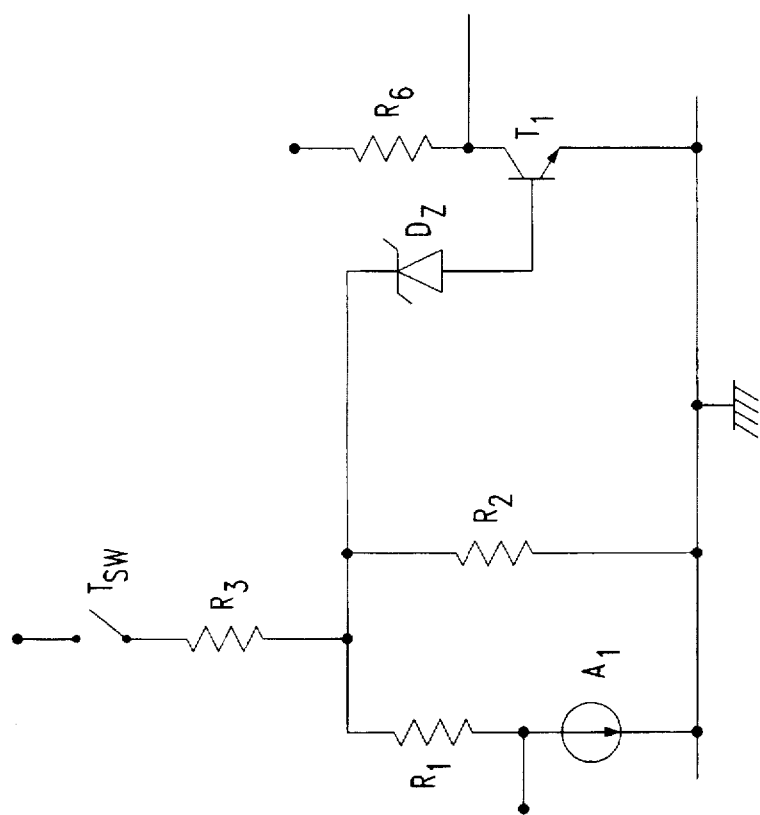
FIG. 3 shows an equivalent circuit of a voltage regulator according to the invention in a broken condition of the battery voltage control cable.

Under these conditions, the input divider is connected to the alternator through TSW and is, therefore, an overall regulation divider as shown in FIG. 3.

R3 can be readily calculated such that the regulated voltage is in this case still the same as in the instance of the sensing cable being connected in the normal manner to the battery.

This applies on condition that the voltage drop across the current generator A1 be negligible, and the input terminal of the regulator be, therefore, at ground potential.

This can be easily obtained at the designing stage by suitably selecting the values of the resistances and the generator, to be typically obtained using an NPN transistor or N-channel MOS transistor.

Under such conditions, the transistors would actually be operating in a saturation zone for an NPN, and a linear zone for a MOS, that is zones where the voltage drop is on the order of tens of millivolts.

The breaking of the alternator-to-battery cable is the least likely event to occur in a motor vehicles because, in view of the importance and the size of this cable (carrying currents on the order of tens of Amperes), its connections receive special attention.

However, in a broken cable situation, the battery would receive no charge and be held at its 12-Volt rating, the comparator COMP1 (5-Volt threshold) would not detect the failure and therefore, with T4 and TSW in the off state, the regulator would keep the alternator constantly under excitation, with consequent overvoltages through the system.

To eliminate this possibility, a regulator according to the invention is additionally provided with the protection arrangement DZ1, DZ2, DZ3, R7, R8, T5 which, being triggered on at a voltage of 16 Volts (BV=VZDZ1+VZDZ2+VZDZ3+VbeT5+VbeT5 * R7/R8=16 Volts), turns on the transistor TSW, thereby applying the alternator voltage across the control arrangement DZ, T1. Thus, the system voltage is never allowed to exceed 16 Volts, which limit is well within the allowance for protection circuits which operate on the occurrence of extremely rare failures.

In FIG. 1, note that transistor $T_{SW}$ is a way to pull down the sense node, and therefore force the winding driver to stay off. $T_{SW}$ is turned on if either T4 or T5 is turned on. T4 is turned on by COMP1 if a sense cable is broken; COMP1 detects this by seeing that the battery sense input is at an impossibly high voltage. T5 is an OPTIONAL addition which turns on in the rare event that the cable from the regulator to the alternator is broken. If T5 were omitted, then transistor T4 could also be omitted, and transistor $T_{SW}$ driven directly by the comparator COMP1, with appropriate biasing.

It will be understood that changes and substitutions may be made unto the embodiments of the invention described hereinabove in ways well known to the skilled persons in the art.

According to a disclosed class of innovative embodiments, there is provided: An automotive voltage regulator, comprising: a connection for receiving a battery voltage signal at a first input; a first amplifier connected to provide current at an alternator field-winding output connection if said battery voltage signal drops below a desired value; a second amplifier which is also operatively connected to monitor the voltage on said battery voltage input, and to disable said first amplifier into voltage on said battery voltage input rises above a maximum possible value, and connected to disable said first amplifier accordingly.

According to another disclosed class of innovative embodiments, there is provided: An automotive voltage regulator, comprising: a connection for receiving a battery voltage signal through a battery sensing cable; a first amplifier connected to provide current at an alternator field-winding output connection if said battery voltage signal drops below a desired value; means for detecting the occurrence of a breakage in the battery sensing cable connection and for disabling said first amplifier when said breakage occurs; and means for detecting disconnection of said regulator and said alternator field winding, and for disabling said first amplifier when such disconnection occurs.

According to another disclosed class of innovative embodiments, there is provided: An automotive charging system, comprising: a battery; an alternator; and a regulator comprising a connection for receiving a battery voltage signal at a first input; a first amplifier connected to provide current at an alternator field-winding output connection if said battery voltage signal drops below a desired value; a second amplifier which is also operatively connected to monitor the voltage on said battery voltage input, and to disable said first amplifier into voltage on said battery voltage input rises above a maximum possible value, and connected to disable said first amplifier accordingly.

According to another disclosed class of innovative embodiments, there is provided: An automotive charging system, comprising: a battery; an alternator; and a regulator comprising a connection for receiving a battery voltage signal through a battery sensing cable; a first amplifier connected to provide current at an alternator field-winding output connection if said battery voltage signal drops below a desired value; means for detecting the occurrence of a breakage in the battery sensing cable connection and for disabling said first amplifier when said breakage occurs; and means for detecting disconnection of said regulator and said alternator field winding, and for disabling said first amplifier when such disconnection occurs. According to another disclosed class of innovative embodiments, there is provided: A method for operating an automotive battery charging system, comprising the steps of: (a.) receiving a battery voltage signal at a regulator, through a battery sensing cable; (b.) driving an alternator field-winding output connection with said regulator, to activate an alternator when said battery voltage signal drops below a desired value; (c.) monitoring the battery sensing cable, and ceasing said step (b.) if the battery sensing cable is found to be disconnected; and (d.) monitoring the alternator field-winding output connection, and ceasing said step (b.) if the alternator field-winding output connection is found to be disconnected from the alternator.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

For another example, the Zener diode protection arrangement proposed is but an example, and may be replaced by other circuits, such as a comparator with a 16-Volt threshold.

What is claimed is:

1. A circuit for regulating a charging voltage applied to a battery by a charging voltage generator, comprising an electric path between a terminal for connection to the generator and a ground, which path includes a switch and a resistive element, and further comprising a control circuit coupled to said electric path and operative to sense the charging voltage and close the switch when the value of that sensed charging voltage drops below a threshold value.

2. A voltage regulating circuit according to claim 1, wherein a voltage drop across said electric path upon the switch being closed has substantially the same value as the regulated charging voltage.

3. An electric supply system for motor vehicles and/or watercraft, comprising a battery, a voltage generator for charging said battery and powering the electric loads connected thereto, and a battery charging voltage regulator, characterized in that said regulator is a device comprised of a voltage regulating circuit as claimed in claim 1.

4. An electric supply system for motor vehicles and/or watercraft, comprising a battery, a voltage generator for charging said battery and powering the electric loads connected thereto, and a battery charging voltage regulator, characterized in that said regulator is a device comprised of a voltage regulating circuit as claimed in claim 2.

5. A circuit for regulating the charging voltage applied to a battery by an alternator coupled with the battery by a rectifier circuit, the alternator including a field inductor, the circuit comprising an input voltage divider with first and second terminals for coupling in parallel with said battery, and further comprising a switch connected between a circuit node interconnecting the field inductor and the battery and being driven from a first control circuit effective to detect a voltage at the voltage divider and close the switch when the value of said voltage drops below a first threshold value.

6. A voltage regulating circuit according to claim 5, further comprising a second control circuit operative to detect a voltage at said interconnecting circuit node and close the switch when its value exceeds a second threshold value.

7. A voltage regulating circuit according to claim 5, wherein the voltage divider comprises first and second resistances connected in series with each other between a terminal for connection to the battery and a ground, wherein the switch comprises a first transistor connected to a circuit node interconnecting the first and second resistances of the voltage dividers and wherein the first control circuit comprises a threshold comparator having a first input terminal connected to a reference voltage, a second input terminal connected to the first terminal for connection to the battery and further connected to ground through a current generator, and an output terminal for driving a second transistor connected between a control terminal of the first transistor and ground.

8. A voltage regulating circuit according to claim 6, wherein the voltage divider comprises first and second resistances connected in series with each other between a terminal for connection to the battery and a ground, wherein the switch comprises a first transistor connected to a circuit node interconnecting the first and second resistances of the voltage dividers and wherein the second control circuit comprises a second transistor connected between a control terminal of the first transistor and ground, said second transistor having a control terminal coupled to the circuit node interconnecting the field inductor and the battery through at least one diode of the Zener type, the threshold voltage to conduction of said at least one diode of the Zener type exceeding the battery rated voltage by a predetermined amount.

9. A voltage regulating circuit according to claim 6, characterized in that the second control circuit comprises a second threshold comparator connected with first and second input terminals between a ground and the circuit node interconnecting the field inductor and the battery.

10. An electric supply system for motor vehicles and/or watercraft, comprising a battery, a voltage generator for charging said battery and powering the electric loads connected thereto, and a battery charging voltage regulator, characterized in that said regulator is a device comprised of a voltage regulating circuit as claimed in claim 5.

11. An electric supply system for motor vehicles and/or watercraft, comprising a battery, a voltage generator for charging said battery and powering the electric loads connected thereto, and a battery charging voltage regulator, characterized in that said regulator is a device comprised of a voltage regulating circuit as claimed in claim 6.

12. An electric supply system according to claim 3, characterized in that the voltage regulating circuit therein is integrated monolithically.

13. A circuit for controlling a charging voltage produced by a voltage generator and applied to a battery, the circuit comprising:

regulating circuitry coupled with the voltage generator, the regulating circuitry further coupled with the battery by a battery sense line and operable to detect the charging voltage applied to the battery, the regulating circuitry adjusting operation of the voltage generator to provide an approximately constant, regulated value of the charging voltage;

a control circuit coupled with the battery sense line and operable to detect a break in the battery sense line, the control circuit operable to provide a voltage approximately equal to the regulated value of the charging voltage to the regulating circuitry.

14. A circuit according to claim 13 wherein the control circuit activates a switching element responsive to detecting the break in the battery sense line, the switching element coupling an electrical path between the regulating circuitry and ground potential, the electrical path providing a voltage drop approximately equal to the regulated value of the charging voltage.

15. A circuit according to claim 14 wherein the control circuit includes a comparator having a first input connected to a reference voltage, a second input coupled with the battery sense line, and an output coupled with the switching element.

16. A circuit according to claim 14 wherein the switching element includes a transistor.

17. A circuit according to claim 14 wherein the charging voltage is applied to the battery via a cable, wherein the control circuit is a first control circuit, and further comprising a second control circuit coupled with the voltage generator and operable to detect a break in the cable, the second control circuit responsively activating the switching element.

18. A circuit according to claim 13 wherein the charging voltage is applied to the battery via a cable, wherein the control circuit is a first control circuit, and further comprising a second control circuit coupled with the voltage generator and operable to detect a break in the cable, the second control circuit responsively limiting the charging voltage produced by the voltage generator to no more than a maximum voltage value.

19. A circuit according to claim 18 wherein the second control circuit includes a zener diode.

* * * * *

UNITED STATES PATENT AND TRADEMARK OFFICE
CERTIFICATE OF CORRECTION

PATENT NO.  : 5,780,995
DATED       : July 14, 1998
INVENTOR(S) : Maggioni, et al.

It is certified that error appears in the above-identified patent and that said Letters Patent is hereby corrected as shown below:

In column 8, claim 7, line 28, delete "dividers" and substitute therefor -- divider, --.

In column 8, claim 8, line 42, delete "dividers" and substitute therefor -- divider, --.

Signed and Sealed this

Twenty-seventh Day of October, 1998

Attest:

BRUCE LEHMAN

*Attesting Officer*          *Commissioner of Patents and Trademarks*